US007568513B2

(12) United States Patent
Teel

(10) Patent No.: US 7,568,513 B2
(45) Date of Patent: Aug. 4, 2009

(54) DRYWALL TAPE AND MUD DISPENSER

(76) Inventor: Paul Teel, 4905 Glen Rose Hwy., Granbury, TX (US) 76048

(*) Notice: Subject to any disclaimer, the term of this patent is extended or adjusted under 35 U.S.C. 154(b) by 466 days.

(21) Appl. No.: 11/307,134

(22) Filed: Jan. 25, 2006

(65) Prior Publication Data

US 2006/0179753 A1 Aug. 17, 2006

(51) Int. Cl.

| | |
|---|---|
| ***B29C 65/52*** | (2006.01) |
| ***B32B 37/12*** | (2006.01) |
| ***B32B 38/04*** | (2006.01) |
| ***B44C 7/04*** | (2006.01) |
| ***B05C 3/02*** | (2006.01) |
| ***B05C 3/12*** | (2006.01) |

(52) U.S. Cl. ....................... 156/510; 156/574; 156/575; 156/577; 156/578; 118/43; 118/123; 118/404; 118/405; 118/423; 52/287.1; 52/416; 52/417; 52/749.1

(58) Field of Classification Search .................. 156/71, 156/166, 250, 256, 307.1, 307.3, 307.7, 510, 156/538, 545, 578, 574, 575, 577; 118/123, 118/404, 405, 419, 423, 43; 52/287.1, 416, 52/417, 749.1

See application file for complete search history.

(56) References Cited

U.S. PATENT DOCUMENTS

| | | | | |
|---|---|---|---|---|
| 2,328,571 A | | 9/1943 | Meyer | 216/33 |
| 2,493,502 A | | 1/1950 | Renne, Jr. | 216/29 |
| 2,679,232 A | * | 5/1954 | Brown | 118/413 |
| 2,717,575 A | * | 9/1955 | Merrifield | 118/413 |
| 3,112,225 A | | 11/1963 | Harms | 118/43 |
| 3,342,160 A | | 9/1967 | Weeks | 118/43 |
| D253,512 S | * | 11/1979 | Davenport et al. | D8/14 |
| 4,452,663 A | | 6/1984 | Heaton | 156/575 |
| 4,689,107 A | | 8/1987 | Entwistle | 156/465 |
| 4,775,442 A | | 10/1988 | Januska | 156/575 |
| 4,996,941 A | | 3/1991 | Mills | 118/419 |
| 2005/0092441 A1 | * | 5/2005 | Pfefferkorn | 156/574 |
| 2007/0034150 A1 | * | 2/2007 | Morton | 118/400 |

* cited by examiner

*Primary Examiner*—Philip C Tucker
*Assistant Examiner*—Sing P Chan
(74) *Attorney, Agent, or Firm*—Walter J. Tencza, Jr.

(57) ABSTRACT

A container is provided having a periphery and a base, which enclose a cavity. The periphery and the base are connected together, the periphery upwardly extending from the base. The periphery has a first slot and a substantially opposing second slot. Each of the first and second slots is sized to permit a first end of a tape located on a roll to be slid through it. A tape holder may be connected to the container so that the tape holder lies outside of the cavity of the container. The roll of tape can be placed on the tape holder so when the tape is pulled through the "mud box", the tape is thereby unwound. As the tape is manually pulled through the "mud box", joint compound is thinly applied to one side of the tape. As this is done, the joint compound begins to "adhere" to the tape, conditioning the tape for excellent wall adhesion.

9 Claims, 3 Drawing Sheets

DRYWALL TAPE AND MUD DISPENSER

FIELD OF THE INVENTION

This invention relates to improved methods and apparatus concerning applying strips of tape to wall joints and wall joint corners.

BACKGROUND OF THE INVENTION

Many devices are available for automatically dispensing mastic or adhesive coated tape for application to wall forming panel joints, ceiling or corner joints. Most of these devices are not effective and some will not even work. Others are relatively complicated, ineffective and difficult to clean as result of being formed by a plurality of interengaging or moving parts and therefore are relatively expensive.

SUMMARY OF THE INVENTION

In one embodiment of the present invention a device is provided with which joint tape may be more efficiently and rapidly "mudded" or coated with an adhesive filler mixture, joint compound, or "mud" usually applied to one side of joint tape for filling and covering joints in a dry wall construction utilizing panels generally known by the trademark Sheetrock.

This invention in one embodiment provides an elongated mud or joint compound containing box having a dispenser paying out a length of tape at one end of the box and a means for severing the tape at the other end of the box which is easily and cheaply constructed and easily cleaned.

An elongated, generally rectangular upwardly open container which may be called a "mud box" supports a quantity of joint compound or drywall mud and features a rectangular bottom conforming to the dimensions of drywall tape across which a length of the tape is drawn from a roll at one end of the box. A reel holder secured to the box permits a peripheral portion of a roll of tape to remain tangent with the plane defining the bottom of the mud box.

The respective end wall of the mud box defines a tape passing slot for sliding movement of the tape while simultaneously coating it with wall filler mud as it moves through the box. The principal object of this invention is to provide a relatively simple and inexpensive combination tape dispenser and mud applicator which includes means for holding a roll of tape with its exit end tangent with the bottom of a mud box and controlling a quantity of mud applied to the tape as well as means for severing the coated tape at a selected length. The "lip up" of stainless steel on each side of the base (on each side of the tape) also keeps the tape in alignment as the "mud box" is being used.

The tape holder swings up or down by the means of an "arm action" for easy reloading. As the roll of tape sits on a base, gravity and friction keeps the roll from "Free Wheeling" as the tape is pulled through.

In one embodiment of the present invention, a container is provided having a periphery and a base, which enclose a cavity. The periphery and the base are connected together, the periphery upwardly extending from the base. The periphery has a first slot and a second slot. Each of the first and second slots is sized to permit a first end of a tape located nearest the roll to be slid through it. A tape holder may be connected to the container so that the tape holder lies outside of the cavity of the container. The roll of tape can be placed on the tape holder so that the roll can be rotated and the tape thereby unwound. The second slot that the tape passes through is gauged to permit the proper thickness of "mud" or joint compound to be applied to the tape.

The periphery may be comprised of a first side wall, a second side wall, a first end wall, and a second end wall, which together with the base form an open box configuration. The first side wall has a bottom connected to the base, a first end connected to the first end wall, and a second end connected to the second end wall. The second side wall lies spaced apart from and opposite of the first side wall, and wherein the second side wall has a bottom connected to the base, a first end connected to the first end wall, and a second end connected to the second end wall. The first end wall has a bottom connected to the base, a first end connected to the first side wall, and a second end connected to the second side wall. The second end wall lies spaced apart from and opposite of the first end wall, and wherein the second end wall has a bottom connected to the base, a first end connected to the first side wall, and a second end connected to the second side wall.

The first slot may be located in the first end wall. The second slot may be located in the second end wall. Each of the first side wall, the second side wall, the first end wall, and the second end wall may be truncated triangular in shape. Each of the first and second slots are may be parallel and adjacent to the base. The open box configuration may be elongated. Each of the periphery and the base may be elongated.

In one embodiment, a method is provided including providing a container having a periphery and a base which enclose a cavity and connecting a tape holder to the container so that the tape holder lies outside of the cavity of the container. A roll of tape can be placed on the tape holder so that the roll can be rotated by pulling the tape through the "mud box" and the tape thereby unwound. The method may include placing the roll on the tape holder, threading the tape through the "mud box", and placing joint compound into the cavity so that the tape will be exposed to the joint compound but only on the top side of the tape.

DETAILED DESCRIPTION OF THE DRAWINGS

Figure 1:
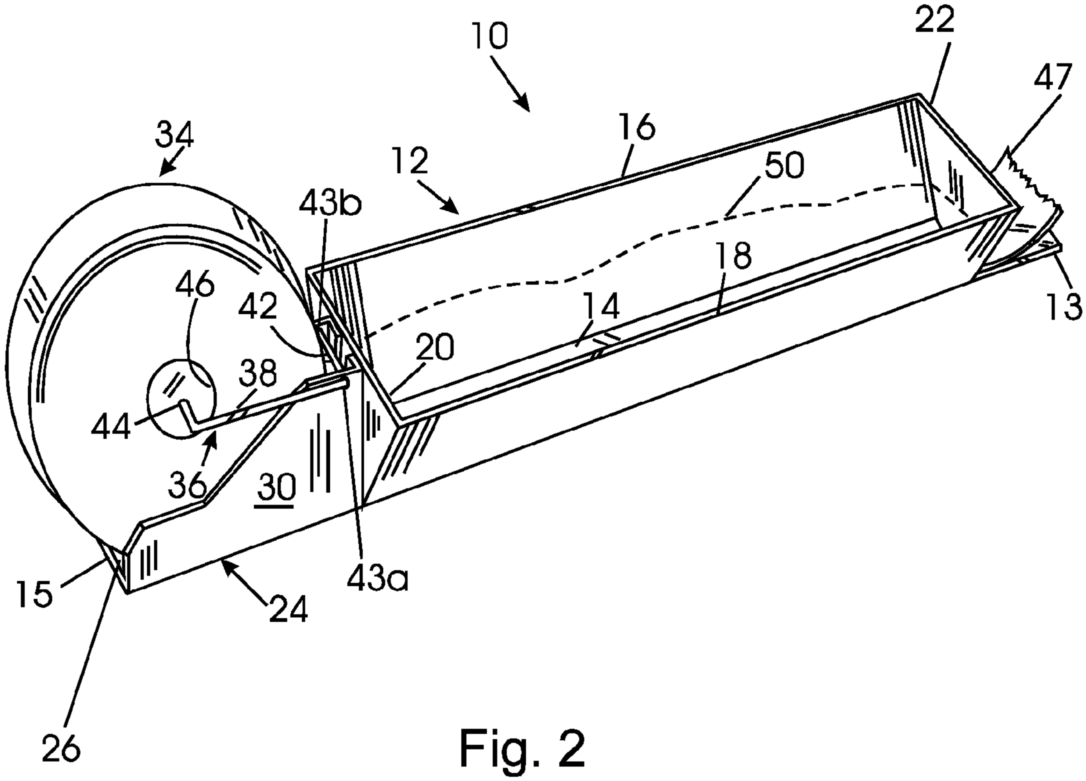
FIG. 1 is a perspective view of the device in operative position containing a quantity of drywall mud, indicated by a dotted line.

Like characters of reference designate like parts in those figures of the drawings in which they occur.

Referring to FIGS. 1-5, the reference numeral 10 indicates the drywall mud box preferably formed from stainless steel sheet material, which is elongated, generally rectangular in overall configuration. The mud box 10 comprises an upwardly open container 12 formed by a rectangular bottom or base portion 14 of selected length, projecting a selected distance at both end portions 13 and 15 beyond the adjacent ends of the container 12. The container 12 further includes upwardly diverging side walls 16 and 18 integrally joined to the base portion 14 and a pair of upwardly diverging end walls 20 and 22.

Figure 3:
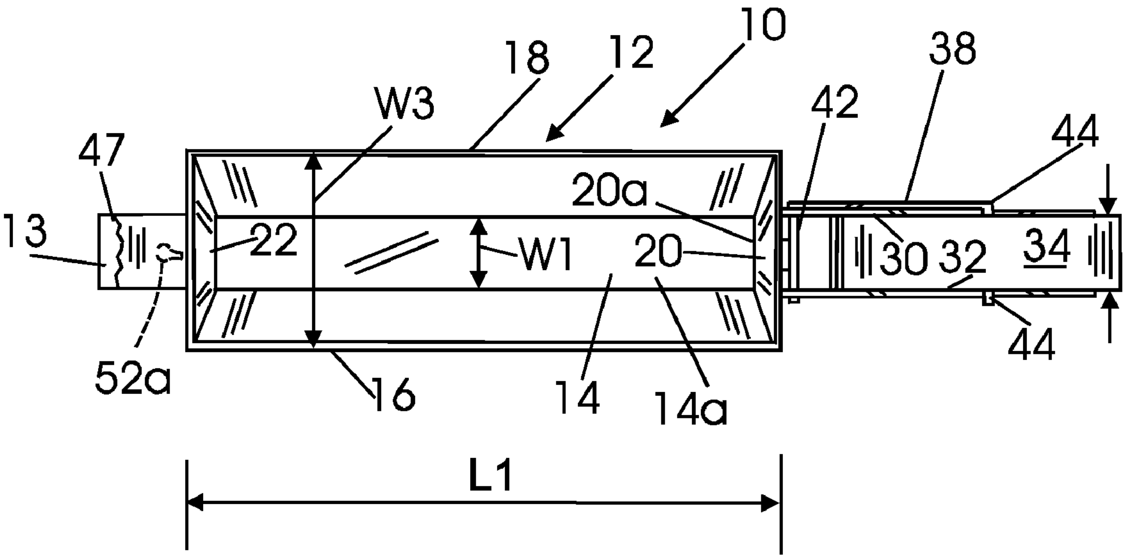
FIG. 3 is a top view of FIG. 2.

The width of the planar base 14, W1, shown in FIG. 3, is substantially equal to the width of tape, W2 shown in FIG. 3, to be dispensed from the device 10 as presently explained and the length, L1, of the container 12 is selected in accordance with the quantity of mud to be used without the necessity of constantly refilling.

The side walls 16 and 18 and end walls 20 and 22 are each truncated triangular in elevation with the end walls 20 and 22 being heliarc welded to the respective side walls.

Figure 2:
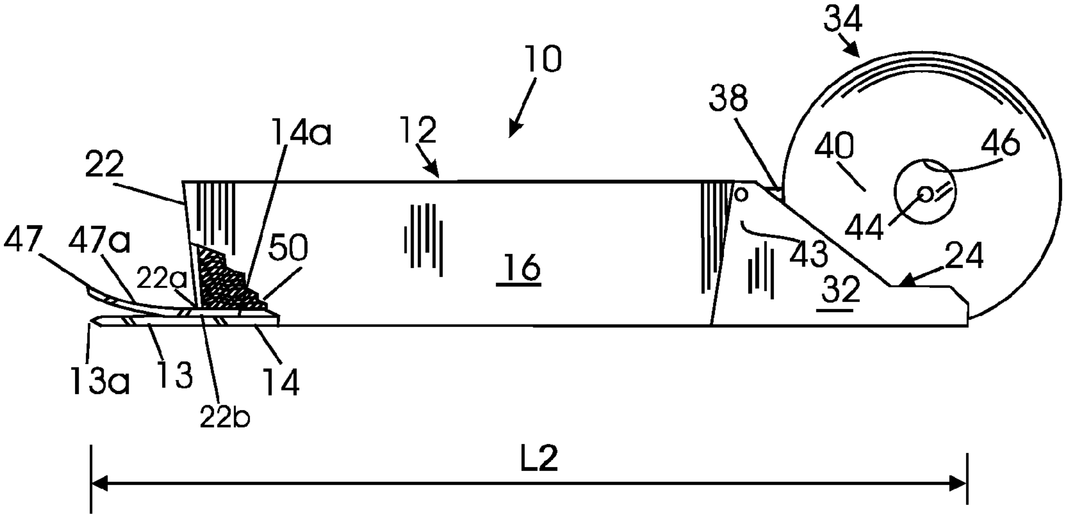
FIG. 2 is a side elevational view, to a smaller scale, of the opposite side of the device, with parts broken away for clarity.

The bottom edge of each of the end walls 20 and 22 is disposed in predetermined spaced relation with respect to the upper surface 14*a* of the base 14 with the depending edge 22*a* shown in FIG. 2, of the end wall 22 acting as a limiting stop edge to ensure a uniform thickness of tape mud on the upper surface 47*a* of tape 47 exiting the container 12.

A tape holder 24 is connected with one end of the container 12 at its end wall 20. The tape holder 24 utilizes the base end portion 15, as shown in FIG. 1, as a bottom wall. The tape holder 24 includes substantially right triangular-shaped tape holding side walls 30 and 32, shown in one or more of FIGS. 1-5, having their right angular edge portions rigidly welded to the base portion 15 and outer surface of the end wall 20, respectively. The walls 30 and 32 loosely receive an arc of a roll of drywall tape indicated at 34.

Figure 4:
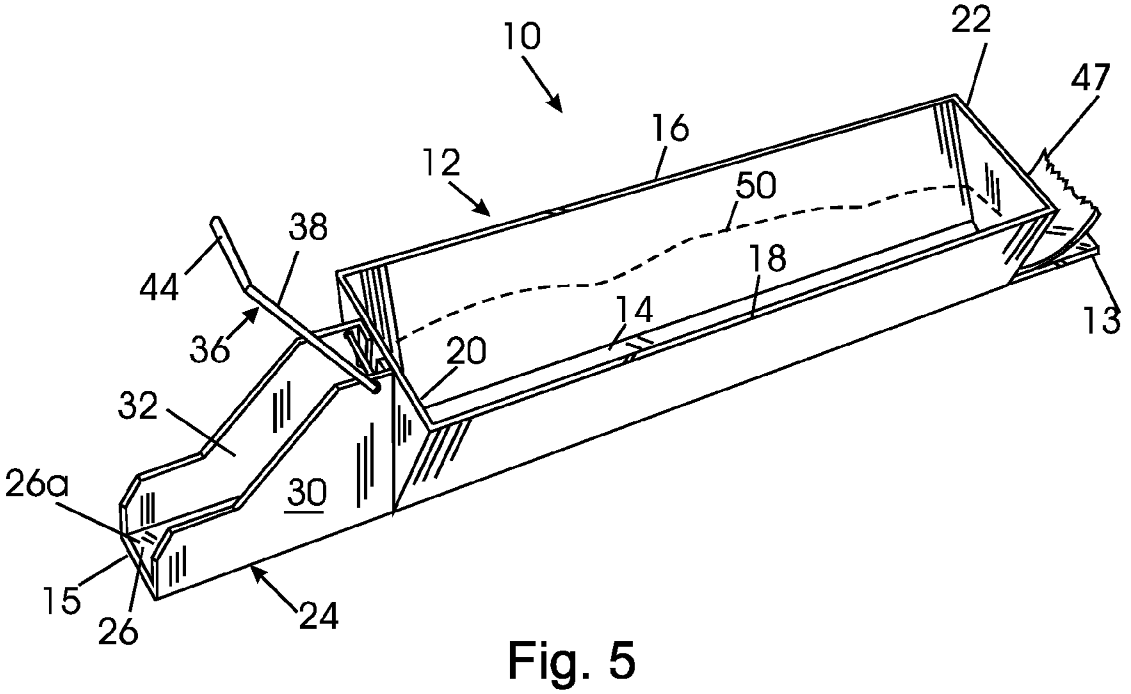
FIG. 4 is a perspective view of the device of FIG. 1, without a roll of tape, and an elongated leg and axle rotated into a position in which a roll of tape can be inserted onto the axle.
Figure 5:
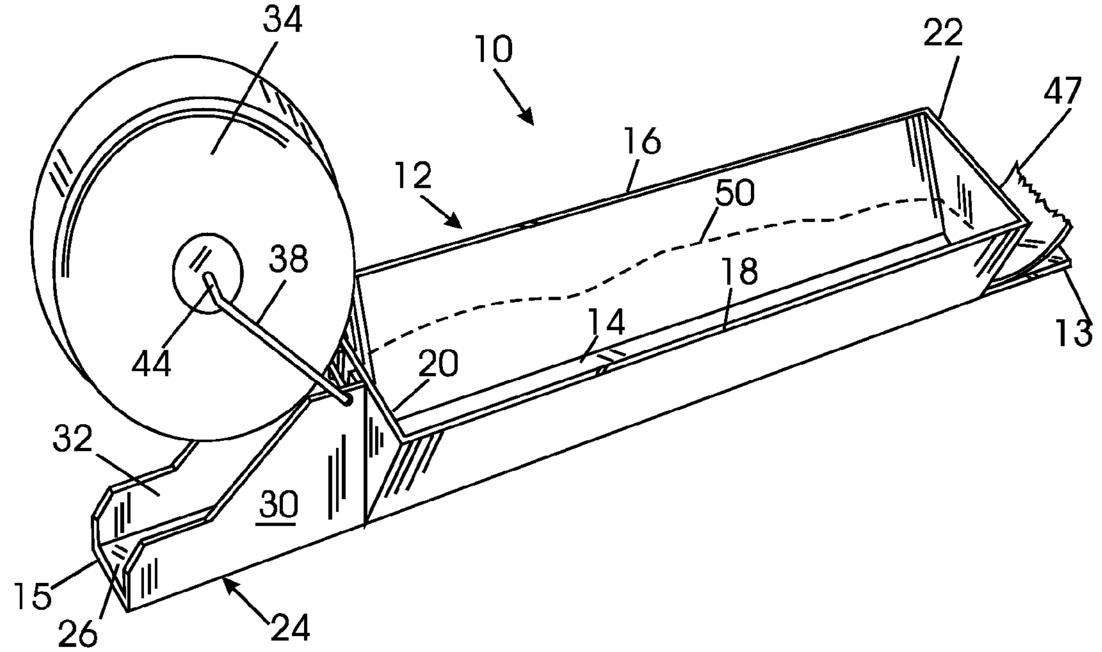
FIG. 5 is a perspective view of the device of FIG. 1, with a roll of tape inserted onto the axle.

A rod-like tape reel 36 includes an elongated leg 38 connected at a right angle with a rod or a bight portion 42 and connected at a right angle with an axle 44. The bight portion 42 projects through suitable line drilled apertures 43*a* and 43*b* in tape holding wall 30 and 32, respectively, adjacent their upper edge limit and the end wall 20. The elongated leg 38 projects away from the container end wall 20. The elongated leg 38 can pivot vertically parallel with the holder walls 30 and 32, about the axis of its rod or bight portion 42, as shown by FIGS. 1, 4, and 5. In FIG. 1, the roll of tape 34 is located on the axle 44 and rests on the base portion 15. In FIG. 4, the rod 38 has been rotated and the roll of tape 34 has been taken off. In FIG. 5, the roll of tape 34 has been inserted back on the axle 44.

The pivotable tape reel 36 permits the downwardly disposed arc of the tape roll 34 to rest on the upper surface 26*a*, shown in FIG. 4, of the tape holding base 26.

The end portion 47 of the tape is threaded through a slot 20*a*, whose location is shown in FIG. 3, under the end wall 20 along the container base 14 and through the slot 22*b* at the opposite or end wall 22, shown in FIG. 2 of the drywall mud container 12.

The hypotenuse edge of the tape holder triangular side walls 30 and 32 may be extended upwardly from the position shown in the drawings and provided with cooperating and confronting circular lugs, not shown, on their respective inner wall surface for rotatably receiving the tape central opening 46 and journaling the roll of tape 34, if desired.

In operation the tape is placed within the tape holder 36 by pivoting the rod 38 upwards until the rod is in a position such as shown in FIG. 4. The roll of tape 34 is then placed on the axle 44 as shown in FIG. 5. The free end 47 of the tape is threaded through the container 12 as described hereinabove. The container 12 is then filled with a desired quantity of mastic or drywall mud indicated by the dotted line 50 in FIGS. 1, 4, and 5.

The tape 47 is manually drawn through the container 12 along its bottom surface 14 wherein the mud or mastic 50 overlying the tape 47 adheres to the top surface of the tape 47. The quantity or layer of mud, not shown, remaining on or clinging to the top surface of the tape 47 being governed by the spacing of or depth of the slot 22*b*, shown in FIG. 2, or opening formed between the depending edge 22*a* of the end wall 22 and the top surface 14*a* of the container base 14.

When a desired length of the tape has been pulled from the container 12 it is torn off or severed by manually pressing a drywall blade against the tape 47, lifting up on the tape 47 thereby cutting the tape 47. Base portion 13 projecting beyond the container wall 22 may be such a drywall blade. Edge 13*a* of the base portion 13, may be a sharp edge or drywall blade.

Since the mud generates considerable friction against the tape, the device 10 may be placed on a saw horse or the like, not shown, and one or more key hole-like slots formed in the base portion 13, as indicated by the dotted lines 52, and in the base portion 15, not shown, may be engaged over a nail head or the like, not shown, projecting above the top surface of the saw horse to prevent longitudinal movement of the device 10 relative to the saw horse as the tape 47 is drawn through the container 12. This permits quick removal and attachment.

One or more embodiments of the invention are typically designed for those who work in construction in the area of finishing out Sheetrock (trademarked), commonly known as "tape and bedding". One or more embodiments can be used in new construction or in quick Sheetrock (trademarked) repairs. The apparatus shown by FIGS. 1-5 is typically small, light and designed to be fast, efficient and easy to use.

The container 12 and the tape holder 24 may be made of twenty-two guage stainless steel. The combination of container 12 and the tape holder 24 may have a length, L2, shown in FIG. 2, of twenty-three and three quarters inches, measured at the bottoms of container 12 and tape holder 24. The container 12 may be elongated, as shown in FIG. 1, with the container 12 having bottom width W1 and a top width W3 shown in FIG. 3, which are substantially less than the length of the container 12. The container 12 may have a length, L1 shown in FIG. 3, of fifteen and one half inches as measured at the bottom 14. The container 12 may have a length of sixteen and on quarter inches as measured from the top of end wall 22 to the top of end wall 20. Each of end walls 20 and 22 may be three and three quarters inches in height, measured perpendicularly to the bottom 14, from the bottom 14 of the container 12 to the top of end wall 20 (or 22). The width of container 12 between side walls 16 and 18, measured perpendicularly to the length of the container 12, may be about four and three quarters inches. The width of end portion 13, measured along the same line as the width of the container 12, may be about two and one eighth inches.

All edges of the container 12 may be helioarc welded or spot welded. The tape reel 36, leg or rod 38, bight portion 42, and axle 44 may be made of stainless steel wire having a diameter of approximately three sixteenths of an inch. The manner in which the tape reel 36 is typically attached to the container 12 has many advantages. Firstly, when a new tape, such as tape 34 is installed on the tape reel 36, the tape 34 automatically drops back to a position sitting on the bottom of end portion 15. The tape roll 34 sits on the bottom of end portion 15 as tape 47 from the tape roll 34 is pulled through the container 12. The natural gravity friction on the outer surface of the tape roll 34 keeps the tape roll 34 from "free wheeling" or from being pulled through the container 12 too quickly. The sides of the tape roll 34 through which the axle 44 runs, keeps the tape roll 34 and the tape 47 aligned properly while in use.

Stainless steel may be used for the container 12 and the tape holder 24. Stainless steel produces an attractive mud box which will never rust. The container 12 may be made of one sheet of stainless steel with the exception of the two end walls 20 and 22. The end walls 20 and 22 may be welded in place as well as the tape side frame or walls 30 and 32 of the tape holder 24 which holds the wire of tape reel 36.

Obviously the invention is susceptible to changes or alterations without defeating its practicability. Therefore, I do not wish to be confined to the preferred embodiment shown in the drawings and described herein.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

What is claimed is:

1. An apparatus comprising:

a container having a periphery and a first base, which enclose a cavity;

wherein the periphery and the base are connected together, the periphery upwardly extending from the base;

wherein the periphery has a first slot and a substantially opposing second slot;

wherein the first slot is sized to permit a first end of a tape located on a roll to be slid through the first slot;

wherein the second slot is sized to permit the first end of the tape located on the roll to be slid through the second slot;

and further comprising a tape holder connected to the container so that the tape holder lies outside of the cavity of the container; and wherein the roll can be placed on the tape holder so that the roll can be rotated and the tape thereby unwound;

wherein the tape holder includes a second base having a upper surface;

the apparatus further comprising a reel comprised of an axle, and an elongated leg, wherein the axle is connected at substantially a right angle to the elongated leg, and the elongated leg is connected to the tape holder so that the elongated leg pivots with respect to the tape holder;

wherein the axle can be inserted through a center of the roll to place the roll in a first state on the axle, so that the roll can rotate about the axle in the first state; and wherein while the roll is in the first state on the axle, the elongated leg pivots to either make the roll rest on the upper surface of the second base or to raise the roll above the upper surface so that the roll does not rest on the upper surface of the second base.

2. The apparatus of claim 1 wherein the periphery is comprised of a first side wall, a second side wall, a first end wall, and a second end wall, which together with the first base form an open box configuration;

wherein the first side wall has a bottom connected to the first base, a first end connected to the first end wall, and a second end connected to the second end wall;

wherein the second side wall lies spaced apart from and opposite of the first side wall, and wherein the second side wall has a bottom connected to the first base, a first end connected to the first end wall, and a second end connected to the second end wall;

wherein the first end wall has a bottom connected to the first base, a first end connected to the first side wall, and a second end connected to the second side wall;

wherein the second end wall lies spaced apart from and opposite of the first end wall, and wherein the second end wall has a bottom connected to the first base, a first end connected to the first side wall, and a second end connected to the second side wall;

wherein the first slot is located in the first end wall; and the second slot is located in the second end wall.

3. The apparatus of claim 2 wherein each of the first side wall, the second side wall, the first end wall, and the second end wall is truncated triangular in shape.

4. The apparatus of claim 2 wherein each of the first and second slots are parallel to the first base.

5. The apparatus of claim 4 wherein each of the first and second slots are adjacent to the first base.

6. The apparatus of claim 2 wherein the open box configuration is elongated.

7. The apparatus of claim 1 wherein each of the periphery and the first base is elongated.

8. The apparatus of claim 1 further comprising a means for cutting the tape outside of the cavity after the first end of the tape has exited the second slot.

9. The apparatus of claim 1 wherein the tape holder includes a first side wall and a second side wall, each of which is substantially parallel to each other and connected to the second base at a substantially right angle, wherein there is a gap between the first side wall and the second side wall, and the roll can be located at least partially into or completely outside of the gap by pivoting the elongated leg, while the roll is in the first state on the axle;

and wherein the roll can be taken off of the axle after the elongated leg has been pivoted to cause the roll to be located completely outside of the gap.

* * * * *